(12) United States Patent
Graf et al.

(10) Patent No.: US 9,341,499 B2
(45) Date of Patent: May 17, 2016

(54) SENSOR SYSTEM

(75) Inventors: Markus Graf, Zürich (CH); Vincent Hess, Zürich (CH); Dominik Niederberger, Zürich (CH)

(73) Assignee: Sensirion AG, Stafa (CH)

(*) Notice: Subject to any disclaimer, the term of this patent is extended or adjusted under 35 U.S.C. 154(b) by 134 days.

(21) Appl. No.: 13/068,628

(22) Filed: May 17, 2011

(65) Prior Publication Data

US 2011/0307208 A1    Dec. 15, 2011

(30) Foreign Application Priority Data

Jun. 4, 2010 (EP) .................................... 10005804

(51) Int. Cl.
*G01D 18/00* (2006.01)
*G01D 3/036* (2006.01)

(52) U.S. Cl.
CPC ............ *G01D 3/0365* (2013.01); *G01D 18/008* (2013.01)

(58) Field of Classification Search
CPC ... G01D 18/00; G01D 18/008; G01D 3/0365; G01D 21/00; G01D 21/02; G01L 19/04; G05D 22/00; G05D 22/02; G01N 27/18
USPC .............................. 702/99, 104; 165/222–225
See application file for complete search history.

(56) References Cited

U.S. PATENT DOCUMENTS

| | | | |
|---|---|---|---|
| 4,097,860 A | 6/1978 | Araseki et al. | |
| 4,403,296 A | 9/1983 | Prosky | |
| 4,607,530 A * | 8/1986 | Chow | 73/708 |
| 4,707,798 A | 11/1987 | Nakano | |
| 4,885,938 A | 12/1989 | Higashi | |
| 4,909,078 A | 3/1990 | Sittler et al. | |
| 4,910,519 A | 3/1990 | Duell et al. | |
| 4,918,995 A | 4/1990 | Pearman et al. | |
| 4,961,348 A | 10/1990 | Bonne | |
| 4,986,243 A | 1/1991 | Weissler, II et al. | |
| 5,196,851 A | 3/1993 | Patel et al. | |

(Continued)

FOREIGN PATENT DOCUMENTS

| | | |
|---|---|---|
| DE | 2311103 | 9/1974 |
| EP | 11000527 | 1/2011 |

(Continued)

OTHER PUBLICATIONS

Miloshevich, et al., "Development and validation of a time-lag correction for vaisala radiosonde humidity measurements", JAOT, Sep. 2004.*

(Continued)

*Primary Examiner* — Gregory J Toatley
*Assistant Examiner* — Ruihua Zhang
(74) *Attorney, Agent, or Firm* — Cooper & Dunham LLP (57) ABSTRACT

Disclosed is a method for adjusting a sensor signal and a corresponding sensor system comprising a sensor for providing a sensor signal representative of a measure other than temperature, dynamic components of the sensor signal being dependent on temperature. In addition there is provided a temperature sensor for measuring the temperature. Dynamic components in the sensor signal are adjusted subject to the temperature sensed, and a compensated sensor signal is supplied. Such sensor system helps compensating for long response times of sensors.

9 Claims, 6 Drawing Sheets

(56) References Cited

U.S. PATENT DOCUMENTS

| 5,237,523 | A | 8/1993 | Bonne et al. |
| 5,339,687 | A | 8/1994 | Gimson et al. |
| 5,515,295 | A | 5/1996 | Wang |
| 5,815,418 | A | 9/1998 | Dolazza et al. |
| 5,951,625 | A | 9/1999 | Duvanenko et al. |
| 6,744,389 | B2 | 6/2004 | Haeberli et al. |
| 2007/0215206 | A1 | 9/2007 | Lull et al. |
| 2011/0282542 | A9* | 11/2011 | Nielsen et al. .................. 701/33 |
| 2012/0255354 | A1* | 10/2012 | Fu et al. ..................... 73/335.04 |

FOREIGN PATENT DOCUMENTS

| GB | 1544818 | 4/1979 |
| JP | 08110317 | 4/1996 |
| JP | 11190653 | 7/1999 |
| WO | WO 0104716 | 1/2001 |
| WO | WO 0118500 | 3/2001 |
| WO | WO 0158019 | 8/2001 |
| WO | WO 2006118899 | 11/2006 |

OTHER PUBLICATIONS

Leiterer, et al., "Correction Method for RS80-A Humicap Humidity Profiles and Their Validation by Lidar Backscattering Profiles in Tropical Cirrus Clouds", JAOT, vol. 22, 2005.*

L. Miloshevich, et al., "Characterization and correction of relative humidity measurements form Vaisala RS80-A radiosondes at cold temperatures", American Meteorological Society, Feb. 2001.*

IEEE Journal of Solid-State-Circuits, P. Malcovati et al., "Smart Sensor Interface with A/D Conversion and Programmable Calibration", vol. 29, No. 8, pp. 963-966, Aug. 1994. Abstract Only.

IEEE Journal of Solid-State Circuits Conference, O. Machul et al., "A Smart Pressure Transducer with On-chip Readout, Calibration and Nonlinear Temperature Compensation Based on Spine-functions", pp. 198-199, Feb. 7, 1999. Abstract Only.

* cited by examiner

SENSOR SYSTEM

CROSS REFERENCE TO RELATED APPLICATIONS

This application claims the priority of European Patent Application 10005804.9, filed Jun. 4, 2010, the disclosure of which is incorporated herein by reference in its entirety.

BACKGROUND OF THE INVENTION

It is the nature of sensors that they react on real impacts with a certain time lag. Especially, this is true in fast varying environments in which the quantity to be measured may change in form of a step function, for example. However, the corresponding sensor signal may not step up to the new real measure value but rather gets there with a certain response time.

There are many applications that only work properly with a sensor supplying a fast response to fast varying measures. However, for many sensors there are limitations in modifying the hardware in order to improve the response time.

BRIEF SUMMARY OF THE INVENTION

The problem to be solved by the present invention is therefore to provide a sensor and a method for providing a sensor signal with improved response time. It is also desired to provide a method for building such a sensor system or pieces of it respectively.

The problem is solved by a sensor system according to the features of claim 1, by a method for adjusting a sensor signal according to the features of claim 7, and by a method for building a compensation filter for use in a sensor system according to the features of claim 12.

According to a first aspect of the present invention, there is provided a sensor system comprising a sensor providing a sensor signal representative of a measure other than temperature, wherein dynamic components of the sensor signal are dependent on temperature. The system further includes a temperature sensor for providing a temperature signal. A compensation filter receives the sensor signal and the temperature signal. The compensation filter is designed for adjusting the dynamic components in the sensor signal subject to the temperature signal, and for providing a compensated sensor signal.

According to another aspect of the present invention, there is provided a method for adjusting a sensor signal. According to this method a temperature is sensed and a sensor signal representative of a measure other than temperature is provided. Dynamic components of this sensor signal typically are dependent on temperature. The dynamic components in the sensor signal are adjusted subject to the temperature sensed. A compensated sensor signal is provided as a result of this adjustment.

Sensors may not immediately react to changes in a measure but only react with a certain delay, also called response time. Such time lag may be owed to the appearance of diffusion processes, which may include a diffusion of the measure into the sensor—e.g. into a housing of the sensor—and, in addition, possibly a diffusion of the measure into a sensor element of the sensor. For some sensors and applications, chemical reactions of the measure with the sensor element may increase the response time, too. While a sensor may perfectly map a static measure into its sensor signal, dynamic components in the measure, such as swift changes, steps, or other high-frequent changes may be followed only with a delay in time.

For such sensors/applications it may be beneficial if the sensor response is dynamically compensated. This means, that the sensor signal, and in particular the dynamic components of the sensor signal are adjusted such that the response time of the sensor is decreased. Such effort in decreasing the response time of a sensor is also understood as compensation of the sensor signal and especially its dynamic components.

By using a dynamic compensation filter the response of a sensor, i.e. its output in response to a change in the measure, will be accelerated. If the dynamics of the sensor including its housing are known, an observer, i.e. a compensation filter, can be implemented to estimate the true physical value of the measure. This observer compensates for the sensor dynamics such that the response can be considerably accelerated in time, which means that the response time can be considerably decreased. This is why the proposed method and system enNance the system dynamics of sensors.

It has been observed that the dynamic components of a sensor response—e.g. the gradient in the sensor signal—may be dependent on the ambient temperature, such that for example the response time of the sensor may be shorter at higher temperatures, and may take longer at lower temperatures. Consequently, in the present embodiments, it is envisaged to apply a compensating filter to the sensor output which compensating filter takes the measured temperature into account. As a result the compensated sensor signal supplied by the compensating filter is even more enhanced in that its deviation from the real measure is improved for the reason that temperature dependency of the sensor dynamics is taken into account of the compensation filter modelling.

Another aspect of the invention provides a method for building a compensation filter for use in a sensor system. In this method, a sensor model of the sensor is built, the sensor model being characterized by a transfer function. A compensation filter is modelled based on an inverse of the transfer function of the sensor model. Temperature dependent terms are applied to the compensation filter.

In another aspect of the present invention, there is disclosed a computer program element for adjusting a sensor signal, the computer program element comprising computer program instructions executable by a computer to receive a sensor signal representative of a measure other than temperature, dynamic components of the sensor signal being dependent on temperature, to adjust the dynamic components in the sensor signal subject to the temperature sensed, and to provide a compensated sensor signal.

Other advantageous embodiments are listed in the dependent claims as well as in the description below. The described embodiments similarly pertain to the system, the methods, and the computer program element. Synergetic effects may arise from different combinations of the embodiments although they might not be described in detail.

Further on it shall be noted that all embodiments of the present invention concerning a method might be carried out with the order of the steps as described, nevertheless this has not to be the only essential order of the steps of the method all different orders of orders and combinations of the method steps are herewith described.

BRIEF DESCRIPTION OF THE DRAWINGS

The aspects defined above and further aspects, features and advantages of the present invention can also be derived from the examples of embodiments to be described hereinafter and are explained with reference to examples of embodiments. The invention will be described in more detail hereinafter with reference of examples of embodiments but to which the invention is not limited.

FIG. 7 illustrates on a temperature scale with different temperature sub-ranges a measure may be exposed to.

DETAILED DESCRIPTION OF THE DRAWINGS

Figure 1:
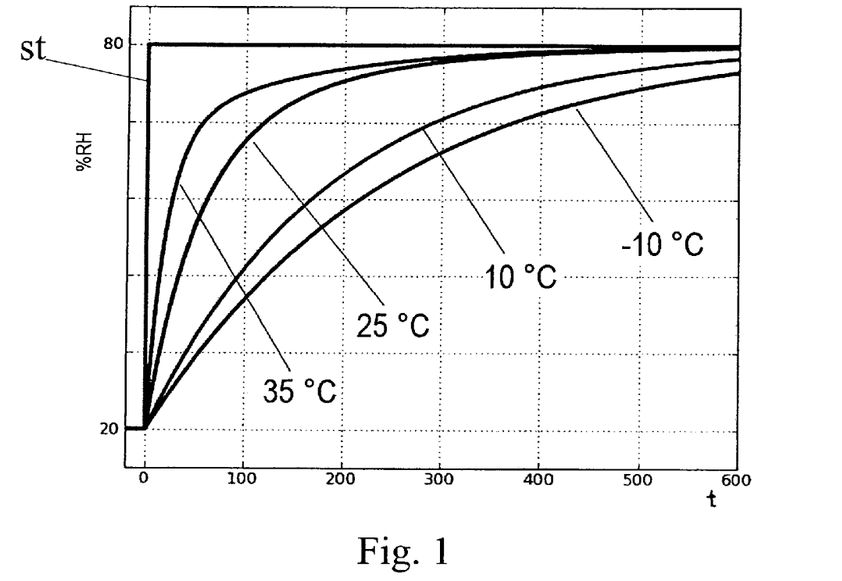
FIG. 1 shows a diagram illustrating a change in a measure and associated sensor signals for different ambient temperatures.

FIG. 1 shows a diagram with a step function st representing an immediate change in the quantity of a measure to be measured. An x-axis of the diagram indicates time in s, the y axis indicates the quantity of the measure to be measured, in this particular case the relative humidity RH(t) in %. Accordingly, at t=0 the relative humidity RH steps up from 20% to 80%. The other graphs in the diagram indicate sensor signals over time provided by a relative humidity sensor in response to the step function st of the relative humidity. It can be derived from these graphs that the humidity sensor cannot immediately follow the change in the measure and approaches the new relative humidity of 80% only with a delay which delay is also called response time. The various graphs represent sensor signals subject to different ambient temperatures in Celsius degrees. Basically, the higher the ambient temperature is the faster the response time of the sensor signal is. The lower the ambient temperature is the longer the response time of the sensor signal is.

Figure 2:
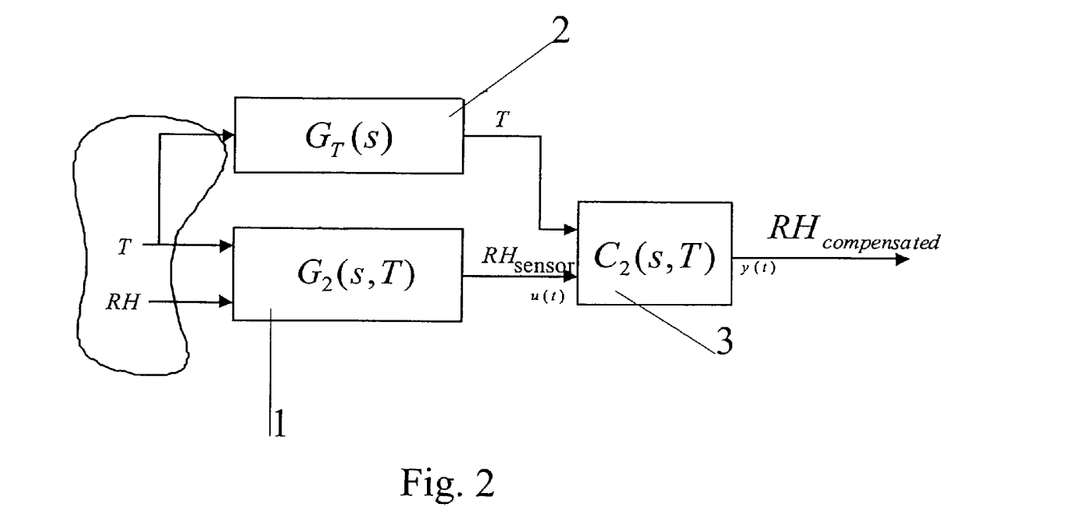
FIG. 2 shows a schematic illustration of a sensor system according to an embodiment of the present invention in a block diagram.

FIG. 2 shows a schematic illustration of a sensor system according to an embodiment of the present invention. A relative humidity sensor 1 senses the ambient relative humidity RH. In the following, the term humidity is used as a synonym for relative humidity. The physics of the humidity sensor 1 is such that dynamics of the sensor signal $RH_{sensor}$ at its output is temperature dependent. Insofar, the humidity sensor 1 of FIG. 2 may behave according to a humidity sensor providing a temperature dependent output according to the graphs in FIG. 1. This means that the response time of the humidity sensor is dependent from the ambient temperature T. Accordingly, in FIG. 2 the ambient temperature T is illustrated as input to the humidity sensor 1 although the humidity sensor 1 is not meant to measure the ambient temperature 1 but rather the dynamics of the sensor signal $RH_{sensor}$ at its output is varying subject to the ambient temperature T.

A second sensor is provided, which is a temperature sensor 2 for measuring the ambient temperature T. The output of the temperature sensor 2 provides a temperature signal T representing the ambient temperature T.

A compensator 3 receives the sensor signal $RH_{sensor}(t)$ over time—which sensor signal is also denoted as u(t)—and the temperature signal T(t) over time, and adjusts the dynamics in the sensor signal $RH_{sensor}(t)$ subject to the temperature signal T(t). As a result of this adjustment, the compensator 3 provides at its output a compensated sensor signal $RH_{compensated}(t)$ over time. In qualitative terms, the compensated sensor signal $RH_{compensated}(t)$ shall compensate for the response time of the humidity sensor 1 at its best and take a gradient that is more close to the gradient of the measure to be measured. As such, the compensator 3 adjusts for the dynamics of the sensor signal $RH_{sensor}(t)$ and consequently for the physics of the sensor 1 not allowing for better response times.

In order to build a compensator 3 that actually compensates for the dynamics of the sensor 1 in the desired way, the behaviour of the sensor 1 needs to be understood. While the following sections are described in connection with humidity sensing, it is understood that the principles can be generalized to any other sensor which shows a response time not satisfying for an application the sensor is used in and in particular a temperature dependent response time.

Modelling the Sensor:

The following describes the modelling of a humidity sensor out of which model a suitable compensator may be derived. Such compensator may be applied down-stream to the real sensor and compensate for dynamics in the sensor signal output by such sensor.

For a humidity sensor, the humidity as the relevant measure needs to reach a sensing element of the humidity sensor. Such sensing element of a humidity sensor preferably is a membrane. For further information on humidity sensing background it is referred to EP 1 700 724. Consequently, the humidity to be measured needs to diffuse into the membrane of the humidity sensor. Prior to this, the humidity needs to diffuse into a housing of the humidity sensor provided the humidity sensor has such housing.

For humidity sensors for which both of these diffusion processes—i.e. from the outside into the housing and from the housing into the sensor element—are relevant both processes are preferred to be respected in a corresponding sensor model.

Both of the processes may be described with a differential diffusion equation with two independent diffusion time constants. In a first approximation, the sensor can be described by a transfer function in the frequency domain with two poles and one zero such that the generic design of a corresponding transfer function $G_2(s)$ may look like, specifically in a second order model:

$$G_2(s) = \frac{Ks+1}{(T_1 s + 1)(T_2 s + 1)}, \quad \text{(Eq. 1)}$$

where s denotes the complex Laplace variable and K, $T_1$, $T_2$ are constants to be identified. $T_1$ and $T_2$ are time constants of the respective diffusion processes and K defines a coupling between the two processes. The transfer function G(s) generally describes the characteristics of the sensor in the frequency domain by $$RH_{sensor}(s)=G(s)*RH(s)$$

If the housing of the humidity sensor is very complex, an additional pole and zero may be added, and the transfer function of the humidity sensor may be amended accordingly.

Some other applications may require a less complex sensor representation. In this case, a first order model may approximate the sensor, which first order model is characterized by a transfer function in the frequency domain with one pole such that the generic design of such transfer function $G_1(s)$ may look like, specifically in a first order model:

$$G_1(s) = \frac{1}{(T_1 s + 1)}. \quad \text{(Eq. 2)}$$

Such model may be sufficient, for example, if the humidity sensor does not include a housing such that the diffusion process into the housing can be neglected, or, if one of the two diffusion processes—either from the outside into the housing or from the housing into the sensor element—is dominant over the other, such that the transfer function may be approximated by the dominant diffusion process only.

There are different ways for identifying the parameters $T_1$, $T_2$ and K. One approach is to find the parameters by trial and error. In a first trial, the sensor output is simulated by the sensor model wherein the sensor model makes use of a first estimation of the parameters. The output of the sensor model then is compared with the sensor signal supplied by the real sensor. Afterwards, the parameters are adjusted until a deviation between the simulated sensor output and the real sensor signal is acceptably small.

For implementing the sensor model in a digital system such as a microcontroller the sensor model preferably is implemented in the discrete time domain rather than in the continuous frequency domain as described by equations 1 or 2. Therefore, the sensor model needs to be digitised, i.e. transformed into a set of difference equations.

First, the differential equations in the frequency domain, e.g. the equations 1 and 2, can be reverse transformed into the time continuous domain by the Laplace back-transform.

For the second order model of the sensor according to equation 1 the equivalent time continuous state space description in the control canonical form is:

$$\begin{bmatrix} \frac{dx_1(t)}{dt} \\ \frac{dx_2(t)}{dt} \end{bmatrix} = A_c^M \cdot \begin{bmatrix} x_1(t) \\ x_2(t) \end{bmatrix} + B_c^M w(t)$$

$$v(t) = C_c^M x(t) + D_c^M w(t)$$

with w(t) denoting the real relative humidity RH at time t in the time domain, x1(t) and x2(t) denoting internal states of the second order sensor model, and v(t) denoting the sensor model output over time t.

In this time continuous state space representation, the coefficients A, B, C and D are determined by:

$$A_c^M = \begin{bmatrix} -\frac{T_1+T_2}{T_1 T_2} & \frac{1}{T_1 T_2} \\ 1 & 0 \end{bmatrix}, B_c^M = \begin{bmatrix} 1 \\ 0 \end{bmatrix}$$

$$C_c^M = \begin{bmatrix} \frac{K}{T_1 T_2} & \frac{1}{T_1 T_2} \end{bmatrix}, D_c^M = 0$$

For a first order sensor model the time continuous state space description in the control canonical form is:

$$\frac{dx(t)}{dt} = A_c^M \cdot x(t) + B_c^M w(t)$$

$$v(t) = C_c^M x(t) + D_c^M w(t)$$

again, with w(t) denoting the real relative humidity RH at time t in the time domain, x(t) denoting an internal state of the first order sensor model, and v(t) denoting the sensor model output over time t.

In this time continuous state space representation, the coefficients A, B, C and D are determined by:

$$A_c^M = -\frac{1}{T_1}, B_c^M = 1, C_c^M = \frac{1}{T_1}, D_c^M = 0$$

Second, the representation in the time continuous domain may be transformed into the time discrete domain.

A time discrete state space representation equivalent to the time continuous state space representation for the second order sensor model may be:

$$\begin{bmatrix} x_1(k+1) \\ x_2(k+1) \end{bmatrix} = A_d^M \cdot \begin{bmatrix} x_1(k) \\ x_2(k) \end{bmatrix} + B_d^M w(k)$$

$$v(t) = C_d^M \begin{bmatrix} x_1(k) \\ x_2(k) \end{bmatrix} + D_d^M w(k)$$

$$\begin{bmatrix} x_1(0) \\ x_2(0) \end{bmatrix} = (I - A_d^M)^{-1} B_d^M \cdot w(0)$$

where w denotes the measured relative humidity at time step k with the sampling time $t(k+1)-t(k)=T_s$. There are two internal states $x_1(k)$, $x_2(k)$ of the second order sensor model. This means $x(k)=(x_1(k), x_2(k))^T$. v(k) denotes the sensor model output in the discrete time domain.

In this time discrete state space representation, the coefficients A, B, C and D are determined by:

$$A_d^M = e^{A_c^M T_s}, B_d^M = (A_c^M)^{-1} (e^{A_c^M T_s} - I) \cdot B_c^M$$

$$C_d^M = C_c^M, D_d^M = D_c^M$$

In addition, $$I = \begin{bmatrix} 1 & 0 \\ 0 & 1 \end{bmatrix}$$

and $T_s$ is the sampling time.

A time discrete state space representation of the time continuous state space representation for the first order sensor model may be:

$$x(k+1) = A_d^M \cdot x(k) + B_d^M \cdot w(k)$$

$$v(k) = C_d^M \cdot x(k) + D_d^M \cdot w(k)$$

$$x(0) = \frac{B_d^M}{1 - A_d^M} w(0)$$

where w(k) denotes the measured relative humidity RH at time step k with the sampling time t(k+1)t(k)=T. There is an internal state x(k) of the first order sensor model. v(k) denotes the modelled sensor output in the discrete time domain.

In this time discrete state space representation, the coefficients A, B, C and D are determined by:

$$A_d^M = e^{-T_1 T_s}, B_d^M = -\frac{1}{T_1}(e^{-T_1 T_s} - 1)$$
$$C_d^M = 1, D_d^M = 0,$$

where $T_s$ is the sampling time.

The derivation of the matrices for the first and the second order sensor model requires Schur decomposition or series expansion and matrix inversion. Computer software may help to calculate the coefficients.

The time discrete state space representations of the first or the second order sensor model may be run on a microprocessor, and the parameters $T_1$ or $T_1$, $T_2$ and K respectively may be varied until the sensor model output v(k) is close enough to the real sensor signal u(t) which may be present in digitized form u(k), too, or may be digitized for comparing purposes.

More sophisticated methodologies for determining the parameters of the sensor model may use system identification tools that automatically build dynamical models from measured data.

Modelling the Compensator:

In a next step, the compensator 3 out of FIG. 2 is determined and implemented. When the humidity sensor 1 is modelled by a second order model then, advantageously, the compensator is modelled by a second order model, too. The transfer function q(s) of such a second order compensation filter 3—also denoted as compensator—in the frequency domain may be described by:

$$C_2(s) = \frac{(T_1 s + 1)(T_2 s + 1)}{(Ks + 1)(Ps + 1)} \quad \text{(Eq. 3)}$$

If a first order sensor model is applied, the following first order compensation filter is proposed, which may be described by a transfer function $C_1(s)$ in the frequency domain by:

$$C_1(s) = \frac{(T_1 s + 1)}{(Ps + 1)}. \quad \text{(Eq. 4)}$$

For both models, s denotes the complex Laplace variable and K, $T_1$, $T_2$ are the constants that were identified when determining the sensor model.

C(s) generally denotes the transfer function of the compensation filter in the frequency domain, wherein $$RH_{compensated}(s) = C(s) * RH_{sensor}(s)$$

Preferably, the compensation filter transfer function C(s) is the inverse to the sensor model transfer function G(s), i.e. the diffusion function, such that $$C(s) = 1/G(s)$$

The term (Ps+1) is introduced in the compensator transfer function to make the function physically applicable. Parameter P is kept small in order to keep impact on filter function low, but can be used to filter measurement noise.

An important feature of the compensation filter transfer function C(s) is that the final value of C(s) converges to 1, i.e.

$$\lim_{s \to 0} C(s) = 1$$

This means that the compensation filter 3 only changes the sensor output characteristic during transition. When the compensation filter 3 is in steady state, it does not affect the sensor output, even if the modelling of the sensor and its housing is inaccurate. Please note that overshoots may occur if the real system response RH(t) is faster than modelled.

Typically, the compensation filter 3 is implemented in a digital system such as a microcontroller which operates on samples of the measured humidity rather than on the continuous signal. As a consequence, microcontrollers cannot integrate and not implement differential equations like those in equation 3 or 4. Therefore, the compensator needs to be digitised, i.e. transformed into a set of difference equations.

First, the differential equations in the spectral domain, i.e. the equations 3 and 4 in the present example, can be reverse transformed into the time continuous domain by the Laplace back-transform.

For the second order compensation filter the time continuous state space description in the control canonical form is:

$$\begin{bmatrix} \frac{dx_1(t)}{dt} \\ \frac{dx_2(t)}{dt} \end{bmatrix} = A_c^C \cdot \begin{bmatrix} x_1(t) \\ x_2(t) \end{bmatrix} + B_c^C u(t)$$

$$y(t) = C_c^C x(t) + D_c^C u(t)$$

with u(t) denoting the measured humidity at time t in the time domain, i.e. the sensor signal $RH_{sensor}(t)$ x1(t) and x2(t) denoting internal states of the second order compensation filter, and y(t) denoting the compensated sensor signal, i.e. $RH_{compensate}(t)$ according to FIG. 2.

In this time continuous state space representation, the coefficients A, B, C and D are determined by:

$$A_c^C = \begin{bmatrix} \frac{K+P}{KP} & \frac{1}{KP} \\ 1 & 0 \end{bmatrix}, B_c^C = \begin{bmatrix} 1 \\ 0 \end{bmatrix}, D_c^C = \frac{T_1 T_2}{KP}$$

$$C_c^C = \begin{bmatrix} \frac{T_1 + T_2}{KP} - \frac{T_1 T_2 (K+P)}{(KP)^2} & \frac{1}{KP} - \frac{T_1 T_2}{(KP)^2} \end{bmatrix}$$

For the first order compensation filter the time continuous state space description in the control canonical form is:

$$\frac{dx(t)}{dt} = A_c^C \cdot x(t) + B_c^C u(t)$$

$$y(t) = C_c^C x(t) + D_c^C u(t)$$

with u(t) denoting the measured humidity at time t in the time domain, i.e. the sensor signal $RH_{sensor}(t)$ in FIG. 2, x(t) denoting an internal state of the second order compensation filter, and y(t) denoting the compensated sensor signal, i.e. $RH_{compensated}(t)$ in FIG. 2.

In this time continuous state space representation, the coefficients A, B, C and D are determined by:

$$A_c^C = -\frac{1}{P}, \; B_c^C = 1, \; C_c^C = \frac{P - T_1}{P^2}, \; D_c^C = \frac{T_1}{P}$$

Second, the representation in the time continuous domain may be transformed into the time discrete domain.

A time discrete state space representation of the time continuous state space representation for the second order compensation filter may be:

$$\begin{bmatrix} x_1(k+1) \\ x_2(k+1) \end{bmatrix} = A_d^C \cdot \begin{bmatrix} x_1(k) \\ x_2(k) \end{bmatrix} + B_d^C u(k) \quad \text{Equ. 5}$$

$$y(t) = C_d^C \begin{bmatrix} x_1(k) \\ x_2(k) \end{bmatrix} + D_d^C u(k)$$

$$\begin{bmatrix} x_1(0) \\ x_2(0) \end{bmatrix} = (I - A_d^C)^{-1} B_d^C \cdot u(0)$$

where u(k) denotes the measured humidity at time step k with the sampling time $t(k+1)-t(k)=T_s$. There are two internal states of the second order compensator, i.e. $x(k)=(x_1(k), x_2(k))^T$. y(k) denotes the compensated sensor signal in the discrete time domain.

In this time discrete state space representation, the coefficients A, B, C and D are determined by:

$$A_d^C = e^{A_c^C T_s}$$

$$B_d^C = (A_c^C)^{-1}(e^{A_c^C T_s} - I) \cdot B_c^C$$

$$C_d^C = C_c^C$$

$$D_d^C = D_c^C$$

A time discrete state space representation of the time continuous state space representation for the first order compensation filter may be:

$$x(k+1) = A_d^C \cdot x(k) + B_d^C \cdot u(k)$$

$$y(k) = C_d^C \cdot x(k) + D_d^C \cdot u(k)$$

$$x(0) = \frac{B_d^C}{1 - A_d^C} u(0)$$

where u(k) denotes the measured humidity at time step k with the sampling time $t(k+1)-t(k)=T_s$. There is an internal state x(k) of the first order compensator. y(k) denotes the compensated sensor signal in the discrete time domain.

In this time discrete state space representation, the coefficients A, B, C and D are determined by:

$$A_d^C = e^{-PT_s}, \; B_d^C = -\frac{1}{P}(e^{-PT_s} - 1)$$

$$C_d^C = \frac{P - T_1}{P^2}, \; D_d^C = \frac{T_1}{P}$$

The derivation of the matrices for the first and the second order compensation filter requires Schur decomposition or series expansion and matrix inversion. Computer software may help to calculate the coefficients.

Figure 4A:
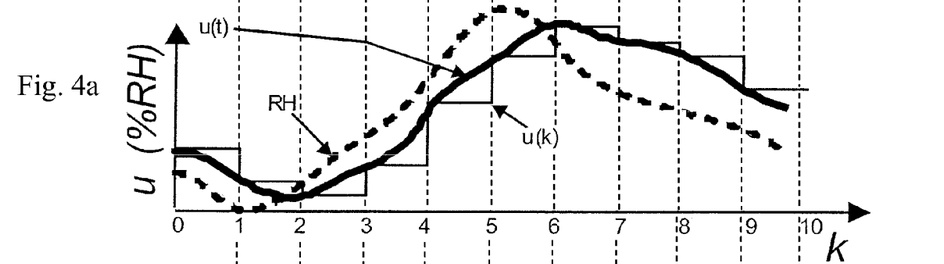
FIG. 4 shows graphs of signals in the discrete time domain which signals appear in a sensor system of an embodiment according to the present invention.

FIG. 4 illustrates sample signals, primarily in the discrete time domain. FIG. 4a illustrates a sample ambient humidity RH over time t. The measured humidity as continuous signal over time is denoted by u(t), i.e. the sensor signal u(t) supplied by the humidity sensor. The sensor signal u(t) is sampled at points k=0, k=1, . . . with the sampling time $T_s=t(k+1)-t(k)$. u(k) denotes the sampled sensor signal which is a time discrete signal.

Figure 4B:
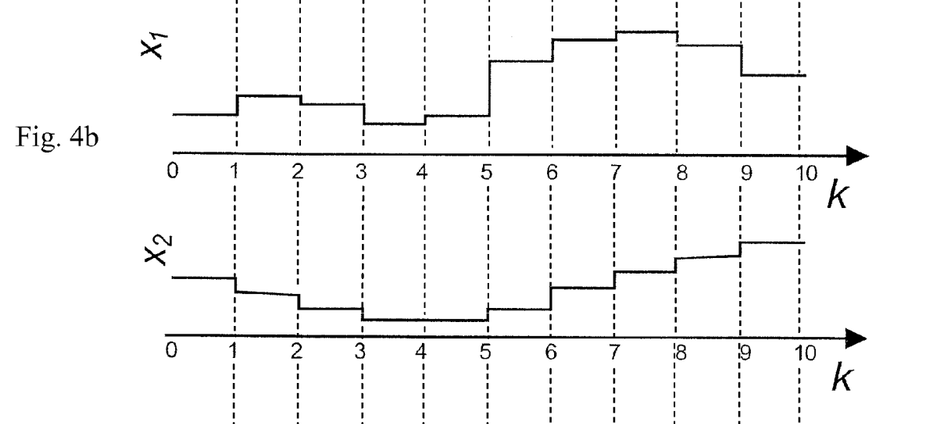
Figure 4C:
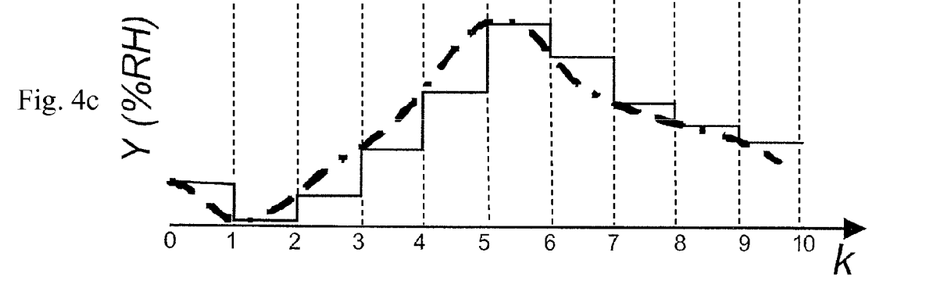

For a second order compensation filter the internal states x1 and x2 over sampling points k are illustrated in graphs 4b. In the last graph 4c, the compensated sensor signal is illustrated as step function in the discrete time domain. For illustration purposes, an equivalent Y in the continuous time domain is depicted as dot and dash line.

Figure 3A:
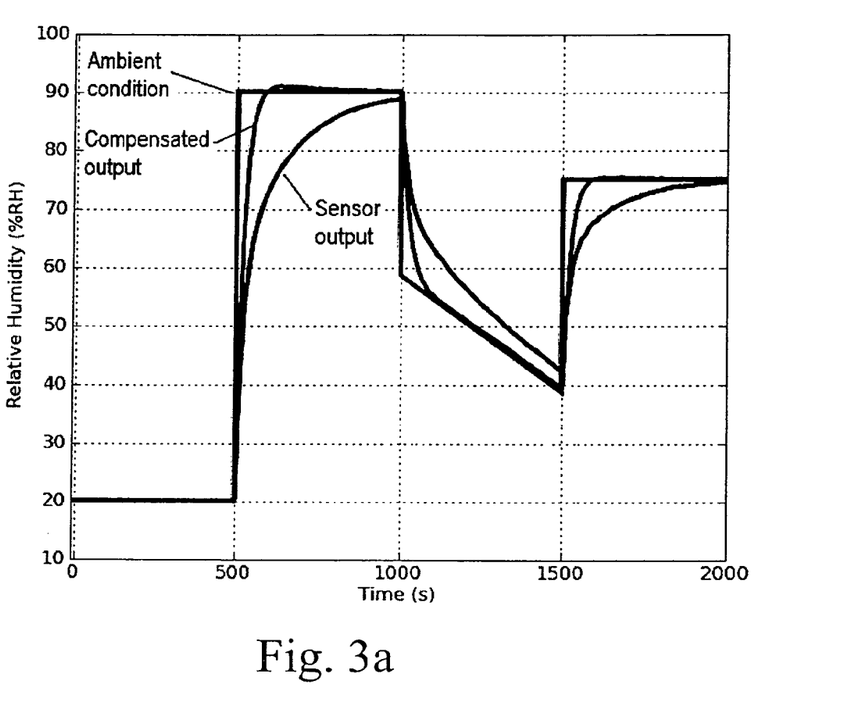
FIG. 3 illustrates diagrams with sample measures, associated sensor signals, and associated compensated sensor signals.
Figure 3B:
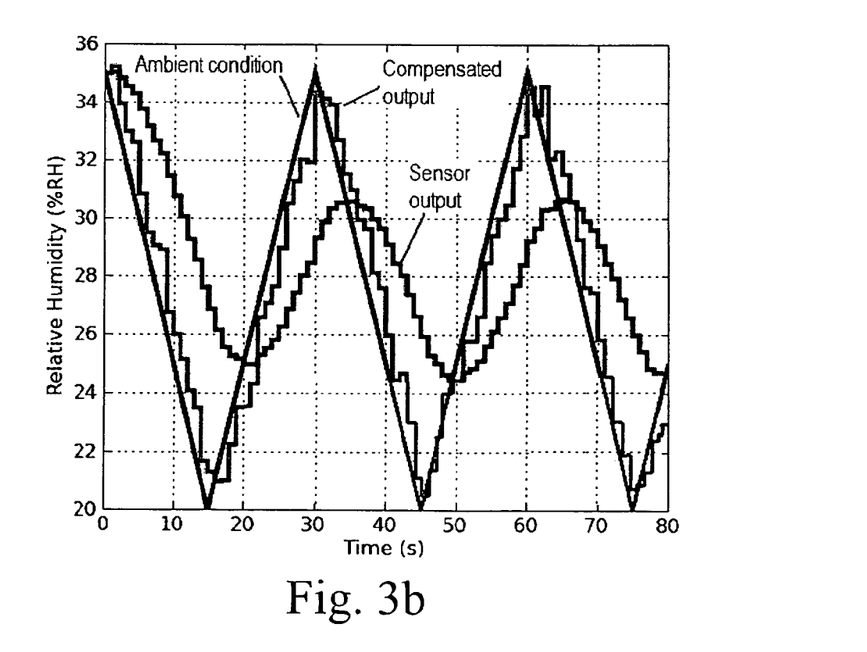

The compensation effect with respect to a sample humidity characteristic over time is also illustrated in the diagrams of FIG. 3. In FIG. 3a, the relative humidity in the environment, denoted as "Ambient condition" is shown as a function of time and includes three step wise changes and a gradient in form of a ramp. The humidity sensor supplies a sensor signal—denoted as "Sensor output"—which exhibits significant response times to the fast changes in the Ambient condition. As mentioned before, the Ambient condition is filtered within the sensor because of the internal diffusion dynamics and the dynamics of the housing. A compensation filter following the sensor supplies a compensated sensor signal—denoted as "Compensated output". In the present example, the compensation filter is implemented as a second order model. As can be derived from the diagram, the Compensated output much more resembles the Ambient condition than the sensor output does without a compensator applied to the sensor output. Consequently, the compensator helps in improving the quality of the measuring system such that the overall output of the sensor system including the compensator provides for a better quality output especially for fast changes in the Ambient condition. FIG. 3b illustrates the Sensor output and the Compensated Output for another Ambient condition characteristic in form of a saw tooth. In this example, the compensation filter is implemented as a first order model.

Figure 5A:
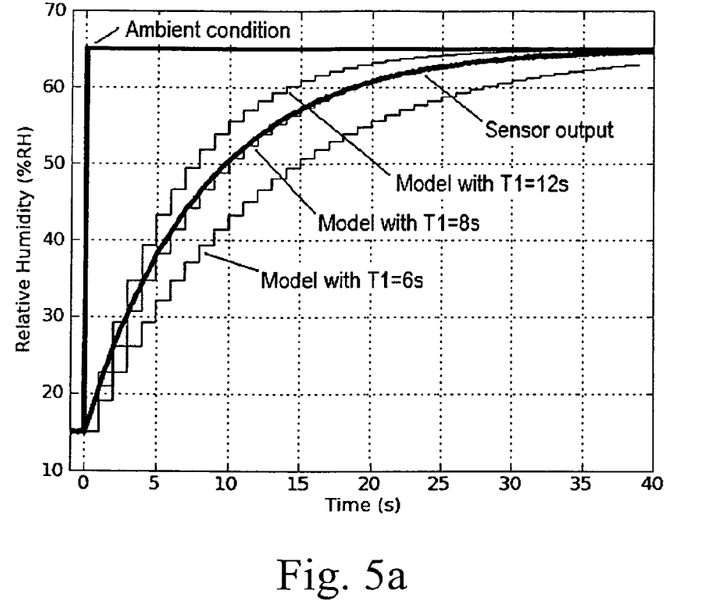
FIG. 5 illustrates graphs for supporting the understanding of how to build a compensation filter according to an embodiment of the present invention.
Figure 5B:
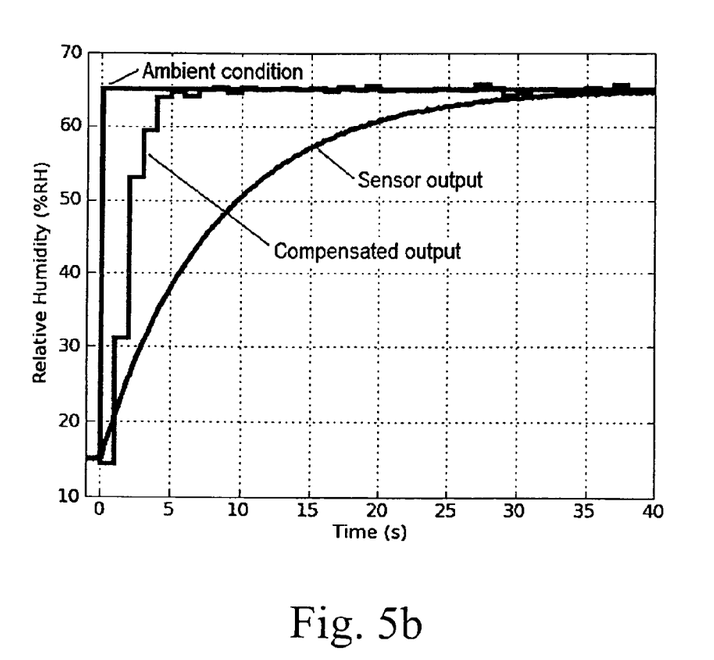

The diagrams in FIG. 5 support the illustration of a method for implementing a sensor system according to an embodiment of the present invention. In a first step, the sensor itself is modelled for the purpose of deriving a compensator model from the data that describes the sensor model. In this first step, the real sensor again is exposed to a step wise increase of the measure, i.e. the relative humidity denoted as "Ambient condition" again. The relative humidity RH is increased in a single step from about 15% to about 65%. The corresponding Sensor output is measured, and preferably stored. The Sensor output exhibiting a response time is plotted in both FIG. 5a and FIG. 5b. Up-front, it is determined, that the humidity sensor used may best be represented by a first order model. Consequently, in a second step, the sensor model is built by means of the transfer function:

$$G_1(s) = \frac{1}{(T_1 s + 1)}$$

and the parameter $T_1$ needs to be determined. In order to determine the parameter $T_1$ such that the output of the sensor model fits the real Sensor output as depicted in FIG. 5 best, the first order type sensor model is implemented on a microcontroller in the time discrete state space according to the equations that were explained previously:

$$x(k+1) = A_d^M \cdot x(k) + B_d^M \cdot w(k)$$
$$v(k) = C_d^M \cdot x(k) + D_d^M \cdot w(k)$$
$$x(0) = \frac{B_d^M}{1 - A_d^M} w(0)$$

With coefficients $$A_d^M = e^{-T_1 T_s}, B_d^M = -\frac{1}{T_1}(e^{-T_1 T_s} - 1)$$
$$C_d^M = 1, D_d^M = 0$$

In this time discrete state space representation of the sensor model, an initial value of the parameter $T_1$ is chosen, e.g. $T_1=6s$. The sensor model output with $T_1=6s$ is illustrated in FIG. 5a. The sensor model is also run with parameters $T_1=8s$ and $T_1=12s$. The corresponding sensor model output is illustrated in FIG. 5a, too.

In a next step, the value of the parameter is chosen that makes the sensor model output come closest to the real sensor signal. From FIG. 5a it can be derived, that this is the case for $T_1=8s$. Accordingly, the complete transfer function of the sensor model in the frequency domain is $$G_1(s) = \frac{1}{(8s+1)}$$

While its representation in the time discrete domain is $$x(k+1) = 0.8465 \cdot x(k) + 0.9211 \cdot w(k)$$
$$v(k) = 0.1667 x(k) + 0 \cdot w(k)$$
$$x(0) = \frac{0.9211}{1 - 0.8465} w(0)$$

The method can be modified in that the sensor is modelled first with a first value of the parameter. If the deviation of the sensor output based on the model with the first parameter value is too large, another value for the parameter is chosen. Iteratively, as many parameter values are chosen as long as there is considered to be sufficient similarity between the sensor model output and the real sensor signal, i.e. the deviation between those two is below a threshold.

In a next step, the compensator model is determined to be a first order model with a general representation in the frequency domain of $$C_2(s) = \frac{T_1 s + 1}{Ps + 1}$$

The representation in the time discrete state space according to the above is:

$$x(k+1) = A_d^C \cdot x(k) + B_d^C \cdot u(k)$$
$$y(k) = C_d^C \cdot x(k) + D_d^C \cdot u(k)$$
$$x(0) = \frac{B_d^C}{1 - A_d^C} u(0)$$

with u(k) denoting the discrete input to the compensator, i.e. the discrete representation of output of the real sensor, and y(k) denoting the discrete output of the compensator, i.e. the compensated sensor signal in the time discrete domain. The corresponding coefficients are:

$$A_d^C = e^{-PT_s}, B_d^C = -\frac{1}{P}(e^{-PT_s} - 1)$$
$$C_d^C = \frac{P - T_1}{P^2}, D_d^C = \frac{T_1}{P}$$

With the determination of the parameter $T_1$ upon implementation of the sensor model, the coefficients A-D of the compensator can now be determined. In this step, parameter P is chosen, too. Parameter P effects reducing the signal noise.

The compensator can now be implemented. In its time discrete state space, the compensator is described by:

$$x(k+1) = 0.3679 \cdot x(k) + 0.6321 \cdot u(k)$$
$$y(k) = 8.0 \cdot x(k) + -7.0 \cdot u(k)$$
$$x(0) = \frac{0.6321}{1 - 0.3679} u(0)$$

The compensator now can be validated on the data measured. P can be adjusted to best performance in the signal to noise ratio SNR.

In the present embodiment, parameter P is chosen as P=1.

Figure 6A:
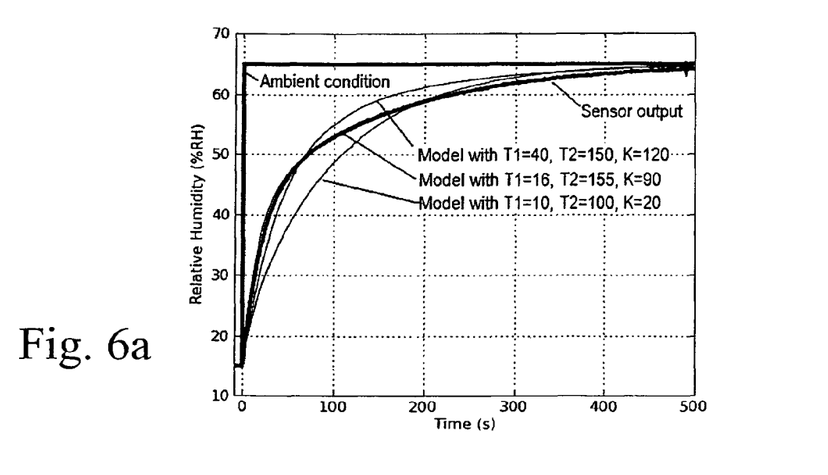
FIG. 6 illustrates graphs for supporting the understanding of how to build a compensation filter according to another embodiment of the present invention.

The Compensated output is shown in FIG. 5b. The response time is limited compared to the uncompensated Sensor output. The compensator, of course works for all kinds of signals The diagrams in FIG. 6 support the illustration of a method for implementing a sensor system according to another embodiment of the present invention. In contrast to the embodiment of FIG. 5 the sensor model and the compensator now are described as a second order model. Besides, the steps of implementing the sensor system including the compensator are the same as described in connection with FIG. 5. Again, in a first step, the sensor itself is modelled for the purpose of deriving a compensator model from the data that describes the sensor model. In this first step, the real sensor again is exposed to a step wise increase of the measure, i.e. the relative humidity denoted as "Ambient condition" again. The relative humidity RH is increased in a single step from about 15% to about 65%. The corresponding Sensor output is measured, and preferably stored. The Sensor output exhibiting a response time is plotted in all FIGS. 5a, 5b and 5c. Consequently, in a second step, the sensor model is built by means of the transfer function:

$$G_2(s) = \frac{Ks + 1}{(T_1 s + 1)(T_2 s + 1)}$$

and the parameter $T_1$, T2 and K need to be determined. In order to determine the parameter such that the output of the sensor model fits the real Sensor output as depicted in FIG. 6a best, the sensor model is implemented on a microcontroller in the time discrete state space according to the equations as given above. Initial values of the parameters are chosen and in an iterative way the parameters are set such that the output of the sensor model fits the sensor signal of the real sensor best. In FIG. 6a, there are illustrated multiple outputs of sensor models implemented with different parameter settings. It can be derived, that the parameter setting of $T_1=16$, $T_2=155$, and $K=90$ fits best. With such a parameter setting, the description of the sensor model in the time discrete state space is finalized.

In a next step, the compensator model is built as a second order model with a representation in the frequency domain—including the parameters as determined while building the sensor model, and assuming parameter P to be set to P=20:

$$C_2(s) = \frac{(16s+1)(155s+1)}{(90s+1)(20s+1)}$$

This compensator model can be described in the time discrete state space by:

$$\begin{bmatrix} x_1(k+1) \\ x_2(k+1) \end{bmatrix} = \begin{bmatrix} 9.78 \cdot 10^{-1} & -2.20 \cdot 10^{-4} \\ 1.98 \cdot 10^{-1} & 1.00 \cdot 10^{-1} \end{bmatrix} \cdot \begin{bmatrix} x_1(k) \\ x_2(k) \end{bmatrix} + \begin{bmatrix} 0.198 \\ 0.020 \end{bmatrix} u(k)$$

$$y(k) = [-0.116 \quad -0.00195] \begin{bmatrix} x_1(k) \\ x_2(k) \end{bmatrix} + 2.756 u(k)$$

$$\begin{bmatrix} x_1(0) \\ x_2(0) \end{bmatrix} = \begin{bmatrix} 0 \\ 1800 \end{bmatrix} \cdot u(0)$$

Figure 6B:
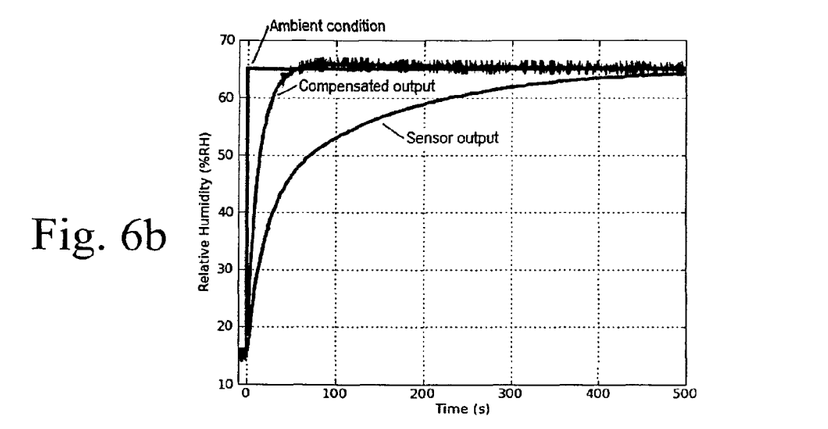
Figure 6C:
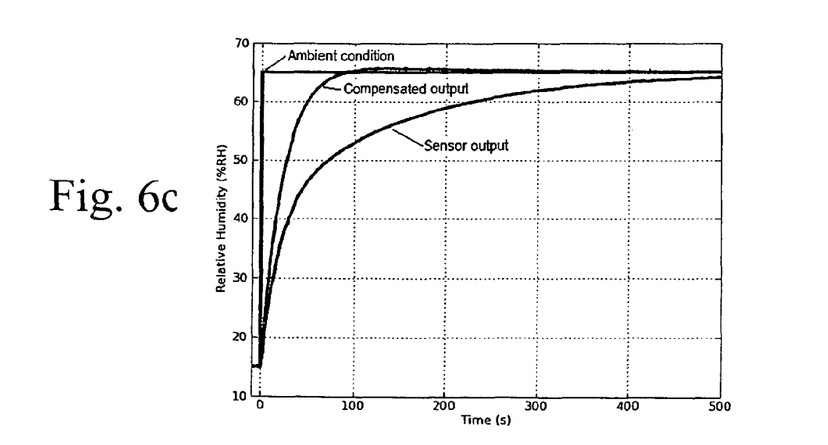

Again, the compensator now can be validated on the data measured. The Compensated output is shown in FIG. 6b and FIG. 6c. Both Compensated outputs differ in that different parameters P are applied. While in FIG. 6b, P is set to P=10, the Compensated output is exposed to significant noise. In FIG. 6c P is set to P=20 which, provides a much better signal to noise ratio SNR.

However, diffusion processes in general depend very much on temperature. Therefore, the model for the compensating filter preferably takes temperature dependency into account—especially if temperature varies by more than 10-20° C. This can be easily achieved by making the constants T1, T2, ..., K, ... time dependent or by using a set of sensor models $G_i(s)$ and corresponding compensator models $C_i(s)$ for different temperature ranges and switching amongst them.

In a preferred embodiment, a second order temperature dependent sensor model may be described in the frequency domain by:

$$G_2(s,T) = \frac{Ks+1}{(T_1(T)s+1)(T_2(T)s+1)}$$

with T being the temperature.

The corresponding compensation filter may be described by $$C_2(s,T) = \frac{(T_1(T)s+1)(T_2(T)s+1)}{(Ks+1)(Ps+1)}$$

In the time continuous state space, the following equations represent the temperature dependent compensator:

$$\frac{dx_1(t)}{dt} = a_{11}(T)x_1 + a_{12}(T)x_2 + b_1(T)u(t)$$

$$\frac{dx_2(t)}{dt} = a_{21}(T)x_1 + a_{22}(T)x_2 + b_2(T)u(t)$$

$$y(t) = c_1 x_1 + c_2 x_2$$

In the time discrete state space, the following equations represent the temperature dependent compensator:

$$x(k+1) = A_d^C(T) \cdot x(k) + B_d^C(T) \cdot u(k)$$

$$y(k) = C_d^C(T) \cdot x(k) + D_d^C(T) \cdot u(k)$$

with coefficients $$A_d^C(T) = \begin{bmatrix} a_{11}^1 + a_{11}^2 T & a_{12}^1 + a_{12}^2 T \\ a_{21}^1 + a_{21}^2 T & a_{22}^1 + a_{22}^2 T \end{bmatrix}$$

$$B_d^C(T) = \begin{bmatrix} b_1^1 + b_1^2 T \\ b_2^1 + b_2^2 T \end{bmatrix}$$

$$C_d^C(T) = [1 \quad 1]$$

$$D_d^C(T) = [d^1 + d^2 T]$$

The determination of $A_d^C(T)$ may be complex. A linear interpolation of matrix elements may be an appropriate way to determine the coefficients.

Alternatively, the temperature range is divided into n sub-ranges i, with temperature sub-range i=0 being the first one, and temperature sub-range i=n being the last one spanning the temperature range covered. For each sub-range i a different sensor model and consequently a different compensator model is determined. For example, the following compensation filter models are determined in the frequency domain for temperature sub-ranges [i=0, ..., i=n]:

$$C_2^1(s), C_2^2(s), C_2^3(s), C_2^4(s), \ldots, C_2^n(s)$$

And accordingly, the different transfer functions are transformed each in the time discrete sate space such that for each temperature range a corresponding compensator model, which may be different from the compensator models for the other temperature ranges, may be provided, stored, and applied whenever the ambient temperature is identified to fall within the corresponding temperature sub-range.

In execution, as illustrated in connection with FIG. 2, the temperature sensor 2 determines the temperature T and supplies such temperature signal to the compensator 3. The compensator 3 determines in which temperature sub-range i the measured temperature T falls into, and applies the compensator model that is defined for such temperature sub-range. The sensor signal u(t) is then compensated by such selected compensator model 3. As a result the entire sensor system comprising the sensor 1, the temperature sensor 2 and the compensator 3 not only compensates for response times, it compensates also for temperature dependencies in the sensor signal. By this means, the sensor system can be applied to environments with fast changing measures which environments are also characterized to be operated under varying temperatures.

Whenever temperature is determined to be in sub-range i, i.e. if T is in $T_i$, then k=I and the corresponding compensator model is applied:

$$x(k+1)=A_d^k(T)\cdot x(k)+B_d^k(T)\cdot u(k)$$

$$y(k)=C_d^k(T)\cdot x(k)+D_d^k(T)\cdot u(k)$$

Figure 7:
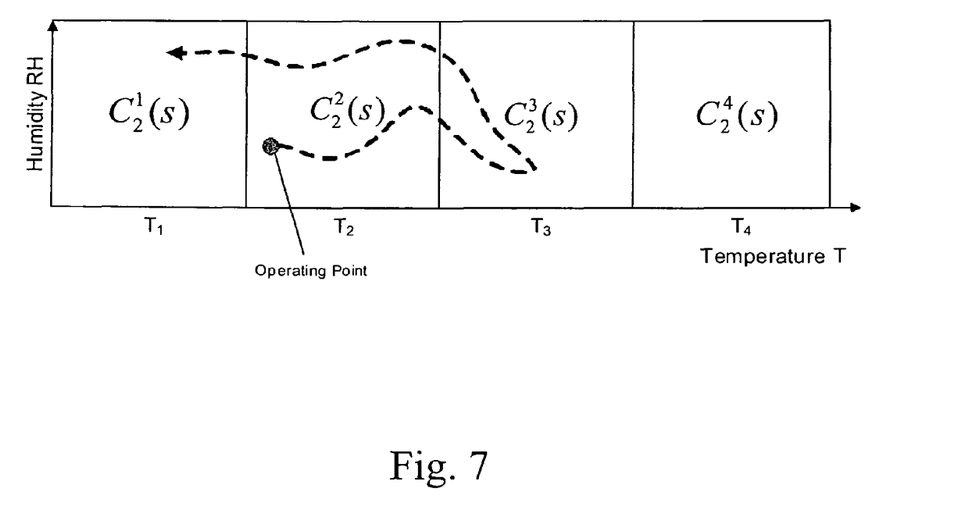

In FIG. 7 there is illustrated a sample temperature range T divided into i=4 sub-ranges, with [i=0, . . . i=n=4]. The dashed line shows a temperature characteristic taken by the temperature sensor 2 out of FIG. 2. The temperature rises first from a temperature in sub-range i=2 to a temperature in sub-range i=3, then falls back to a temperature in sub-range i=2, and further drops to a temperature in sub-range i=1. Consequently, during this measurement cycle, three compensator models are applied in sequence to the humidity sensor signal, i.e. the models i=2, i=3, i=2 again and finally i=1 corresponding to the temperature ranges.

The compensator 3 including its models may preferably be implemented in software, in hardware, or in a combination of software and hardware.

Preferably, the sensor system and the corresponding methods may be applied in the antifogging detection for vehicles. In such application, it is preferred that the sensor 1 is a humidity sensor. The humidity sensor may be arranged on or close to a pane such as a windscreen, for example. In addition, the temperature sensor may be arranged on or close to the pane, too, for measuring the ambient temperature, preferably at the same location the humidity sensor covers.

The results of the measurements may be used to take action against a fogged windscreen, for, example, and start operating a blower.

The invention claimed is:

1. A sensor system, comprising
a sensor providing a sensor signal representative of a measure other than temperature, dynamic components of the sensor signal being dependent on temperature,
a temperature sensor for providing a temperature signal,
a compensation filter receiving the sensor signal and the temperature signal, wherein the compensation filter is designed for adjusting the dynamic components in the sensor signal subject to the temperature signal, and for providing a compensated sensor signal, wherein the compensation filter comprises multiple different compensation models, wherein each of said compensation models is provided in a spectral domain and is associated to a temperature sub-range, and wherein each compensation model itself is invariant to changes in temperature.

2. A sensor system according to claim 1, wherein the compensation filter comprises a temperature continuous compensation model.

3. A sensor system according to claim 1, wherein the compensation filter is designed for determining a sub-range where the temperature signal falls within, and for applying the compensation model associated with the determined sub-range.

4. A sensor system according to claim 1, wherein the sensor is a humidity sensor.

5. A sensor system according to claim 4, wherein the humidity sensor and the temperature sensor are arranged on a pane of a vehicle for detecting fogging of the pane.

6. A method for adjusting a sensor signal, comprising the steps of:
(a) sensing a temperature,
(b) providing a sensor signal representative of a measure other than temperature, dynamic components of the sensor signal being dependent on temperature, and
(c) by a computing device configured for doing so,
(i) adjusting the dynamic components in the sensor signal subject to the temperature sensed, and
(ii) providing a compensated sensor signal,
wherein the dynamic components in the sensor signal are adjusted by applying multiple different compensation models, wherein each of said compensation models is provided in a spectral domain and is associated to a temperature sub-range, wherein each compensation model itself is invariant to changes in temperature, and wherein said steps are executed on a sensor system according to claim 1.

7. A method according to claim 6, wherein the dynamic components in the sensor signal are adjusted by applying a temperature continuous compensation model.

8. A method according to claim 6, wherein a temperature sub-range is determined where the sensed temperature falls within, and wherein the compensation model associated with the determined temperature sub-range is applied to the sensor signal.

9. A method according to claim 6, wherein the sensor signal represents measured humidity, and wherein the compensated sensor signal is used in an antifogging application in a vehicle.

* * * * *